Dec. 11, 1934.  M. RICHTER  1,984,319
FLUID OPERATED RECIPROCATING MECHANISM FOR KNITTING MACHINES
Filed Oct. 1, 1931  2 Sheets-Sheet 1
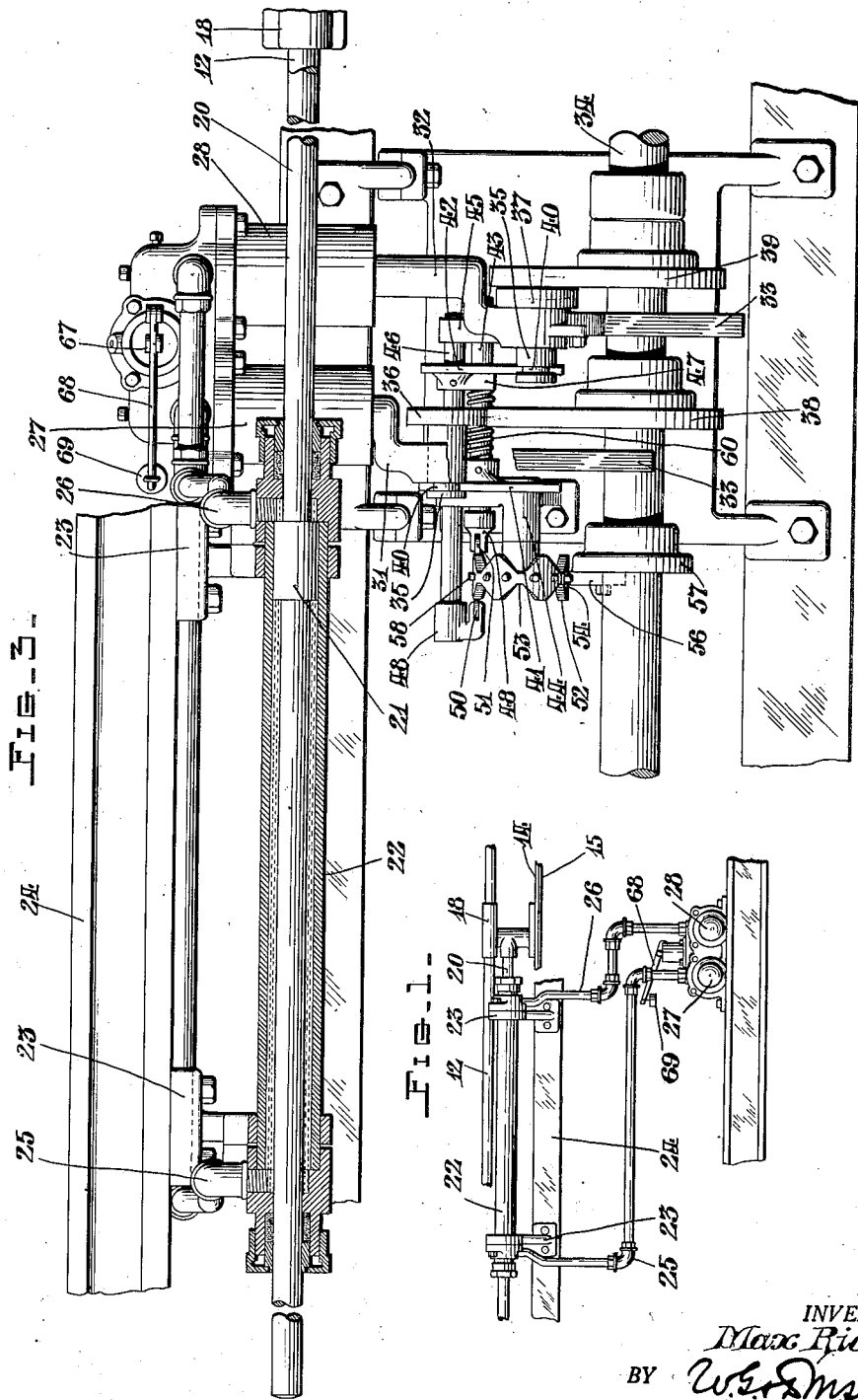
INVENTOR:
Max Richter,
BY
ATTORNEYS.

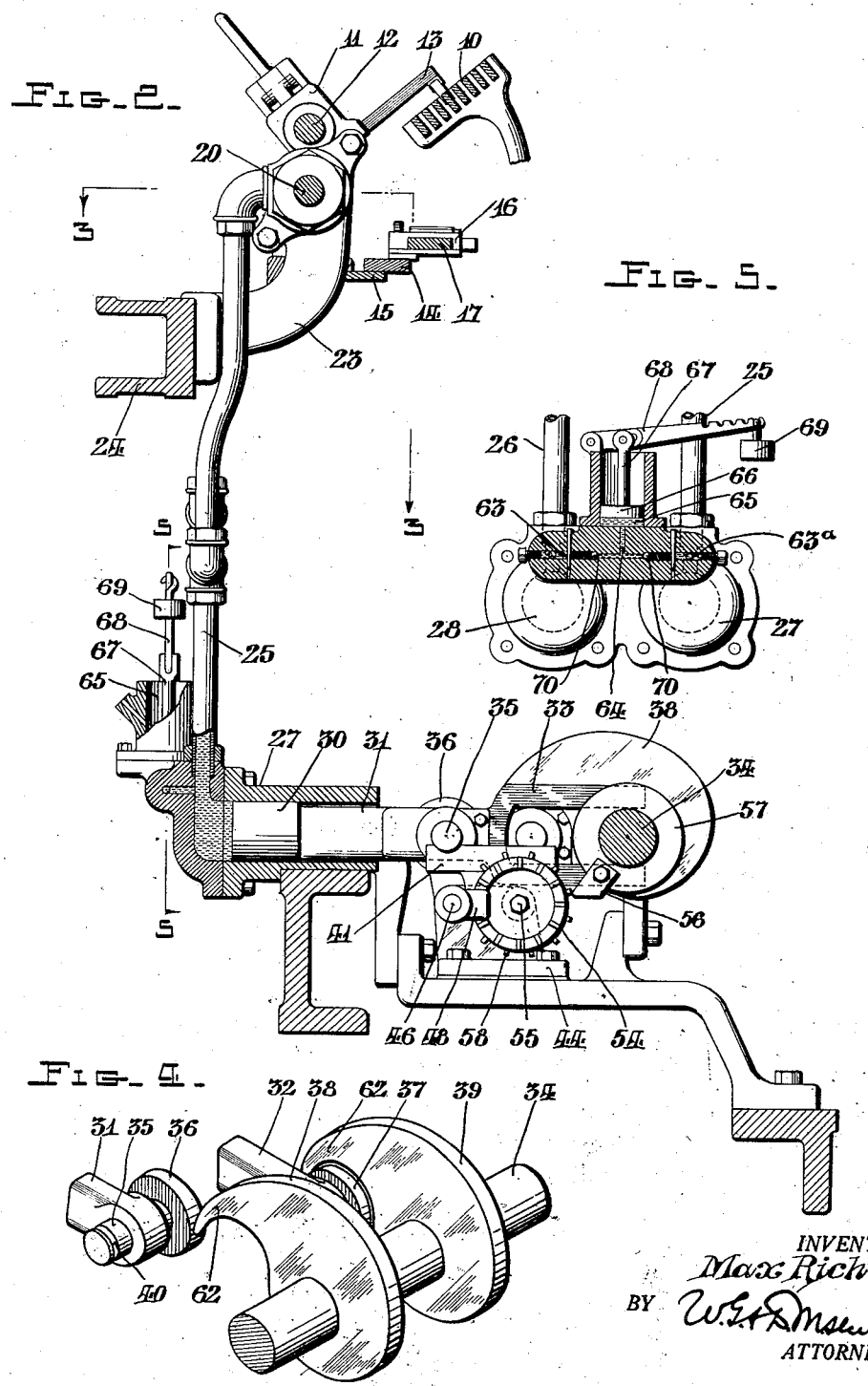

Patented Dec. 11, 1934

1,984,319

UNITED STATES PATENT OFFICE 1,984,319

FLUID OPERATED RECIPROCATING MECHANISM FOR KNITTING MACHINES

Max Richter, West Reading, Pa., assignor to Textile Machine Works, Wyomissing, Pa., a corporation of Pennsylvania Application October 1, 1931, Serial No. 566,264

17 Claims. (Cl. 66—82)

My invention relates to full fashioned knitting machines and particularly to fluid operated mechanism for effecting reciprocating movements of the usual friction rod and connecting bar carrying the slur cock boxes in such machines.

Heretofore, it has been common practice to effect reciprocation of the friction rod and connecting bar of a full fashioned knitting machine by means of a "coulier mechanism" connected to said rod and bar and operated by the cam shaft for obtaining the desired reciprocation of these parts. In carrying out my invention I provide a fluid motor controlled and operated by the cam shaft in lieu of the "coulier mechanism" for effecting reciprocation of the friction rod and connecting bar. The fluid motor comprises a fluid containing cylinder within which is a piston having a piston rod connected to the friction bar and connecting rod and movable to effect reciprocation thereof. The cylinder of the motor is connected at or near opposite ends to a pair of pump cylinders having pistons operable in alternation by cams rotatable with the cam shaft of the knitting machine. The alternate pulsatory operation of the pump pistons is controlled by the cam shaft through the intermediary of mechanism for positioning cam followers on the pump piston rods in proper positions relatively to the cams on the cam shaft to cause operation of one pump piston by the cam shaft while the other pump piston is disengaged from the cam shaft. My invention also includes a compensating device for replenishing the fluid in the motor cylinder, conduits and pump cylinders in the event of leakage of fluid therefrom so that the formation of air pockets in the system is prevented and uniform operation of the motor is insured.

In the drawings:

Figure 1 is a diagrammatic view of the fluid motor for effecting reciprocation of the friction rod and connecting bar together with the duplex pump for operating the motor;

Figure 2 is a fragmentary elevation, partly in section, of a portion of a full fashioned knitting machine embodying my invention;

Figure 3 is a sectional plan view on the line 3—3 of Figure 2, and illustrates the mechanism for controlling and operating the fluid motor;

Figure 4 is a fragmentary perspective view showing the relation of the cam followers on the pump piston rods to the operating cams on the cam shaft, and, Figure 5 is a sectional view, on the line 5—5 of Figure 2, of the compensating device.

Referring to the drawings, a plurality of thread carrier rods 10 are adapted to be selectively connected to a friction box 11 on a reciprocable friction rod 12 by a member 13. A connecting bar 14 is guided for reciprocation on frame member 15 to move cock boxes 16, mounted on the bar, along the slur cock bar 17. A bracket 18 connects friction rod 12 to connecting bar 14 so that the connecting bar, the friction rod and a carrier rod connected to the friction box may be reciprocated in unison.

Friction rod 12 and connecting bar 14 are reciprocated by means of a fluid operated motor comprising a piston rod 20 connected to bracket 18 and having a piston 21 movable in opposite directions in a piston cylinder 22 supported by brackets 23 mounted on the part 24 of the knitting machine frame. Piston cylinder 22 communicates at or adjacent opposite ends thereof with conduits 25 and 26 connected to pump cylinders 27 and 28, respectively. Pistons 30 in each pump cylinder are reciprocable by cam operated piston rods 31 and 32. Bifurcated plates 33 secured to the ends of piston rods 31 and 32 cooperate with the usual cam shaft 34 of the knitting machine to guide the pistons in their movements. Piston rods 31 and 32 support slidable studs 35 carrying rollers 36 and 37 engageable by cams 38 and 39, respectively, secured to cam shaft 34.

The motor cylinder 22, the conduits 25, 26 and pump cylinders 27, 28 are filled with a non-compressible fluid, such as oil or glycerine, so that the motor piston 21 may be moved first toward one end of cylinder 22 and then toward the other, to effect reciprocation of the friction rod and carrier bar, by alternate operation of piston rods 31 and 32 by the respective cams 38 and 39. The alternate operation of these piston rods is effected by controlling the positions of rollers 36 and 37 so that roller 36 is in the plane of cam 38 and roller 37 out of the plane of cam 39 during one revolution of cam shaft 34 and vice versa in a succeeding revolution. To this end the studs 35 are provided with grooves 40 engaged by arms 41 and 42, respectively. The arm 41 is secured to a rod 43 slidably mounted in brackets 44 and 45. Arm 42 is secured to a rod 46 also slidable in the brackets 44, 45 and is provided with a lateral extension 47 which is bifurcated to embrace rod 43. Sleeves 48 mounted on corresponding ends of the rods 43 and 46 support roller contact members 50 and 51 engageable by a plurality of alternately raised and depressed surfaces 52, 53 on opposite edges of a control cam 54 carried by a stub shaft 55 supported in bracket 44. A projecting lug 56 secured to a collar 57 fixed to cam shaft 34 is adapted to engage peripheral teeth or pins 58 on the control cam 54 for effecting a step motion thereof on each rotation of cam shaft 34. A spring 60 is mounted on rod 43 between a boss on arm 41 and the lateral extension 47 of arm 42. Spring 60 acts to maintain the contact rollers 50, 51 engaged with the raised or depressed portions of control cam 54 on successive step movements of the cam thereby moving rods 43 and 46 in opposite directions to shift roller 36 into the plane of cam 38 and simultaneously positioning roller 37 out of the plane of cam 39 during one revolution of cam shaft 34 and effecting a reversal of the relation of rollers 36, 37 to the cams 38, 39 on the succeeding revolution of the cam shaft.

The greater portion of the periphery of each of the cams 38, 39 is eccentric with respect to shaft 34. The cams are also cut away at one side producing a lobe-like part 62 permitting one piston roller to be positioned for engagement by the portion of its cam closest to shaft 34 at the time the other roller is about to move from engagement with the most eccentric portion of its cam. The remaining portion of the periphery of each of the cams 38, 39 is concentric with shaft 34 and provides a dwell so that for a part of each revolution of the cams the engaged roller is not moved thereby. Consequently, the related piston rod is not driven when its roller contacts the concentric portion of the associated cam and for an interval during each cam shaft revolution the fluid motor is not operated.

Pump cylinders 27 and 28 are connected by passages 63 and 63a, respectively, and a common passage 64 with a fluid reservoir 65. A piston 66 in reservoir 65 has a piston rod 67 connected to a pivoted lever 68 acted on by a weight 69 which may be positioned at various points on lever 68 to regulate the pressure exerted on the fluid in the reservoir by piston 66. Check valves 70, illustrated as spring pressed balls, are provided in passages 63 and 63a and are adapted to permit the flow of fluid from reservoir 65 into the pump cylinders in the event of leakage of fluid from the pump cylinders, the conduits, or from either side of the piston in motor cylinder 22. Check valves 70 are seated by the pressure of fluid during the work stroke of the pistons 30 in the pump cylinders so that fluid is not forced into the reservoir.

The operation is as follows: At the end of a revolution of cam shaft 34 the piston in pump cylinder 27 has been given the greatest movement for which cam 38 is designed and the roller 36 carried by piston rod 31 is in contact with the end of the lobe 62, or portion of greatest eccentricity, of cam 38. The movement of piston rod 31 by cam 38 during this revolution of the cam shaft has resulted in forcing fluid from pump cylinder 27 through conduit 25 into motor cylinder 22 moving piston 21 therein to or adjacent the right hand end of the motor cylinder. During this movement of piston 21, the latter forced fluid out of the motor cylinder through conduit 26 into pump cylinder 28. As a result, piston rod 32 has been displaced to position roller 37 carried thereby at the side of cam 39 adjacent the cut away portion thereof in position to be shifted into the plane of the cam 39 for engagement with the concentric portion of the periphery thereof, cam 39 being in a rotative position to permit such shifting movement of roller 37. Rollers 36 and 37 are then shifted to cause reversal of the operation of the fluid motor.

Figure 4 illustrates the relative positions of rollers 36, 37 and cams 38, 39 immediately prior to the shifting of these rollers for reversing the operation of the motor. On completion of a revolution of cam shaft 34, the lug 56 carried by collar 57 on the shaft engages a pin 58 on the periphery of control cam 54 and turns the latter an amount equal to the distance between two pins. The turning of cam 54 moves raised portions 52 thereof from alinement with contact rollers 50, 51 and moves depressions 53 at opposite edges of the cam into alinement with the contact rollers. The spring 60 on rod 43 acts on the arms 41, 42 and moves the rods 43 and 46 in opposite directions so that the contact rollers 50, 51 are seated in the depressions of control cam 54. Such movements of arms 41, 42, also result in sliding the studs 35 in their guides in piston rods 31, 32 so that roller 36 is moved to the left of the plane of cam 38 and roller 37 is moved to the right into the plane of cam 39.

As cam shaft 34 rotates the concentric portion of cam 39 engages roller 37 without effecting movement of piston rod 32 and the lobes 62 of cams 38, 39 move away from the rollers 36, 37. When the eccentric portion of cam 39 contacts roller 37, piston rod 32 is moved forcing fluid from pump cylinder 28 through conduit 26 into motor cylinder 22 at the right hand end thereof. Thus, piston 21 is moved to the left and acts through piston rod 20 and bracket 18 to move connecting bar 14, and friction rod 12 to the left (Fig. 3) in unison. The movement of piston 21 forces fluid from motor cylinder 22 through conduit 25 into pump cylinder 27 moving the piston therein toward the outer end of cylinder 27. As a result, piston rod 31 is operated moving roller 36 toward cam shaft 34, this movement of roller 36 at the side of cam 38 being possible inasmuch as the roller has been shifted out of the plane of the cam, as described above. As piston rods 31, 32 move respectively toward and away from cam shaft 34 the studs 35 move along arms 41 and 42 which engage the grooves in the studs.

At the end of a revolution of cam shaft 34, cam 39 has imparted its maximum operating movement to piston 32, the end of lobe 62, or most eccentric portion, of the cam being in contact with roller 37. The movement of piston rod 31 by fluid forced into pump cylinder 27 on movement of motor piston 21 has resulted in positioning roller 36 at the side of cam 38 adjacent the cut away portion thereof which is rotatively positioned to permit roller 36 to be shifted into the plane of cam 38.

Lug 56 engages a pin 58 on control cam 54 turning the latter so that as the raised portions 52 thereof are moved into alinement with rollers 50, 51 the latter are cammed to the left and right respectively against the force of spring 60. The action of cam 54 on rollers 50, 51 results in shifting rods 43, 46 in opposite directions so that arms 41, 42 move rollers 36, 37 to the right and left, respectively, into and out of the planes of the associated cams 38, 39. Thus, the operation of the fluid motor is reversed and during the next revolution of cam shaft 34 the piston 21 is moved toward the right hand end of motor cylinder 22 and connecting bar 14 and friction rod 11 are moved in unison to the right.

From the above description it will be seen that during one revolution of the cam shaft the fluid motor is operated to move the connecting bar and piston rod in unison in one direction. At the end of the revolution of the cam shaft the latter conditions the fluid motor for a reversal of operation. During the interval that the rollers carried by the pump pistons engage the concentric portion of the operative cam in the first part of each revolution thereof the fluid motor is not operated and the dividers and needles of the knitting machine may be operated in the usual manner. Throughout the remainer of a revolution of the cam shaft the fluid motor is reversely operated to move the connecting bar and friction rod in the direction opposite to their movement during the preceding revolution.

The use of a fluid operated motor for reciprocating the connecting bar and friction rod, or other parts of a knitting machine, results in smooth operation of these parts in both directions of movement. The provision of a compensating device for replenishing the fluid supply in the event of leakage prevents the formation of air pockets and insures an equalization of fluid pressures for both directions of motor operation and results in smooth reciprocation of the connecting bar and friction rod at a uniform rate in each direction of movement.

Although a preferred embodiment of my invention has been illustrated in the accompanying drawings and described above, there are numerous changes and variations which may be made without departure from my invention and, therefore, I desire to include all such changes and variations within the scope of the appended claims. It should also be understood that while my invention has been described in connection with the friction rod and connecting bar of a full fashioned knitting machine it is equally adapted for use in conjunction with other parts in such a machine to which it is desired to impart reciprocating movements, and, in fact, is also applicable for effecting similar reciprocation of parts of other types of machines.

What I claim is:

1. In a full fashioned knitting machine having a reciprocable member; a reversible fluid motor operatively connected to said member; a rotatable shaft; and fluid pressure generating means actuated by said shaft for operating said motor in opposite directions to reciprocate said member.

2. In a full fashioned knitting machine having a reciprocable member; a reversible fluid motor operatively connected to said member; a rotatable shaft; cam means carried by said shaft and fluid pressure generating means actuated by said cam means for causing alternate operations of said motor in opposite directions to effect reciprocation of said member.

3. In a full fashioned knitting machine having a reciprocable friction rod and a reciprocable connecting bar; a reversible fluid motor operatively connected to said rod and bar for effecting reciprocation thereof; a pair of pump cylinders connected to said motor; pistons movable in said cylinders; and means for actuating said pistons in succession to operate said motor in alternately opposite directions for reciprocating said rod and bar.

4. In a full fashioned knitting machine having a reciprocable friction rod and a reciprocable connecting bar; a reversible fluid motor operatively connected to said rod and bar for effecting reciprocation thereof; a pair of pump cylinders connected to said motor; pistons movable in said cylinders; a rotatable shaft; and cam means carried by said shaft for actuating said pistons in alternation to operate said motor in opposite directions for reciprocating said rod and bar.

5. In a full fashioned knitting machine having a reciprocable friction rod and a reciprocable connecting bar; a reversible fluid motor operatively connected to said rod and bar for effecting reciprocation thereof; a pair of pump cylinders connected to said motor; pistons movable in said cylinders; a rotatable unidirectional shaft; and cam means carried by said shaft for actuating one of said pistons during one rotation of said shaft to operate said motor in one direction and for actuating the other piston during a succeeding rotation of said shaft to operate said motor in the opposite direction.

6. In a full fashioned knitting machine having a reciprocable friction rod and a reciprocable connecting bar; a reversible fluid motor operatively connected to said rod and bar for effecting reciprocation thereof; a pair of pump cylinders connected to said motor; pistons movable in said cylinders; a rotatable unidirectional shaft; cam means carried by said shaft for actuating one of said pistons during one rotation of said shaft to operate said motor in one direction and for actuating the other piston during a succeeding rotation of said shaft to operate said motor in the opposite direction; and means for reversing the operative relation of said cam means and said pistons at the end of a rotation of said shaft.

7. In a full fashioned knitting machine having a reciprocable friction rod and a reciprocable connecting bar; a reversible fluid motor operatively connected to said rod and bar; a rotatable shaft; means actuated by said shaft for operating said motor during one rotation of said shaft to cause movement of said rod and bar in one direction by said motor; means actuated by said shaft for reversely operating said motor during a succeeding rotation of said shaft to cause movement of said rod and bar in the opposite direction by said motor; and means operated by said shaft for controlling said motor operating means to reverse the direction of operation of said motor at the end of each rotation of said shaft.

8. In a full fashioned knitting machine having a reciprocable member; a reversible fluid motor connected to said member and operable in opposite directions for reciprocating said member; a pair of fluid pumping cylinders connected to said motor; pistons in said cylinders; a rotatable shaft; a pair of cams carried by said shaft; and individual rollers slidably associated with the piston rods of said pistons and adapted to be engaged by said cams for actuating said pistons, one roller being positioned in the plane of one of said cams for actuating the related piston to operate said motor in one direction, the other roller being positioned out of the plane of the other cam.

9. In a full fashioned knitting machine having a reciprocable member; a reversible fluid motor connected to said member and operable in opposite directions for reciprocating said member; a pair of fluid pumping cylinders connected to said motor; pistons in said cylinders; a rotatable shaft; a pair of cams carried by said shaft, individual rollers slidably associated with the piston rods of said pistons and adapted to be engaged by said cams for actuating said pistons, one roller being positioned in the plane of one of said cams for actuating the related piston to operate said motor in one direction, the other roller being positioned out of the plane of the other cam; and means controlled by said shaft moving said one roller from the plane of said one cam and for moving the other roller into the plane of said other cam for actuating the related piston to operate said motor in the opposite direction.

10. In a full fashioned knitting machine having a friction rod and a connecting bar; means for reciprocating said rod and bar in unison comprising, a fluid motor having a fluid cylinder; a piston movable in said cylinder and operatively connected to said rod and bar; a pair of pump cylinders, said cylinders being in communication with said motor cylinder at opposite sides of the piston therein; a rotatable shaft; a pair of eccentric cams secured to said shaft; pistons in said pump cylinders, said pistons having piston rods extending toward said shaft; individual rollers movably mounted on said pistons; means for positioning one of said rollers for engagement with one of said cams and for maintaining the other roller from engagement with the other cam; and means for moving said one roller from engagement with said one cam and for moving said other roller into engagement with said other cam for actuating the related piston to operate said motor.

11. In a full fashioned knitting machine having a reciprocable member, a fluid pressure motor operatively connected to said member for effecting reciprocation thereof, a pair of pump cylinders in communication with said motor, a piston movable in each of said cylinders and a rotatable cam shaft having cams alternately engageable with said pistons for successively actuating the latter to operate said motor alternately in opposite directions.

12. A machine as set forth in claim 11 including a shifting device associated with said pistons and arranged to alternately present said pistons for engagement by the cams of said cam shaft.

13. In a full fashioned knitting machine having a reciprocable member and a rotatable member, a fluid pressure motor operatively connected to said reciprocable member for effecting reciprocation thereof, said motor including a cylinder having a piston therein, and combined inlet and discharge parts at opposite ends thereof, a pair of pump cylinders having communication respectively with said cylinder end ports, pistons in said pump cylinders a pair of cams on said rotatable member, a shifting device associated with said pump pistons and arranged to alternately effect engagement of said pump pistons with said cams, and means on said rotatable member for actuating said shifting device.

14. A machine as set forth in claim 13 in which the fluid pressure motor and pump cylinders constitute a pulsatory hydraulic system.

15. A straight knitting machine comprising, in combination, a cam shaft, yarn-feeding mechanism including a thread carrier rod and a reciprocable rod connected to said thread-carrier rod for actuating the latter, and drive means including a fluid-operated motor for actuating said reciprocable rod in timed relation with said cam shaft.

16. A straight knitting machine comprising, in combination, a cam shaft, a yarn-feeding mechanism including a thread carrier rod and a friction rod connected to said thread-carrier rod for actuating the latter, and drive means including a fluid-operated motor for actuating said friction rod in timed relation with said cam shaft.

17. In a full fashioned knitting machine having a rotatable shaft, a reciprocable member, a fluid pressure motor operatively connected to said member for effecting reciprocation thereof, a pair of pump cylinders in communication with said motor, a piston movable in each of said cylinders, and means for successively actuating said piston to operate said motor alternately in opposite directions, comprising cams on said rotatable shaft arranged to alternately engage and disengage said pistons, and a shifting device associated with said shaft for effecting such engagement and disengagement.

MAX RICHTER.